(12) United States Patent
Nomura et al.

(10) Patent No.: US 12,429,945 B2
(45) Date of Patent: Sep. 30, 2025

(54) INFORMATION PROCESSING APPARATUS AND ADJUSTMENT SCREEN DISPLAY METHOD

(71) Applicant: SONY INTERACTIVE ENTERTAINMENT INC., Tokyo (JP)

(72) Inventors: Masanori Nomura, Tokyo (JP); Shoi Yonetomi, Kanagawa (JP); Yurika Mulase, Tokyo (JP); Ryosuke Sakurai, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/729,523

(22) PCT Filed: Jul. 7, 2022

(86) PCT No.: PCT/JP2022/026988
§ 371 (c)(1),
(2) Date: Jul. 17, 2024

(87) PCT Pub. No.: WO2023/157332
PCT Pub. Date: Aug. 24, 2023

(65) Prior Publication Data
US 2025/0093952 A1 Mar. 20, 2025

(30) Foreign Application Priority Data
Feb. 18, 2022 (JP) .................. 2022-023962

(51) Int. Cl.
*G06F 3/01* (2006.01)
*G02B 7/02* (2021.01)
(Continued)

(52) U.S. Cl.
CPC ............. *G06F 3/013* (2013.01); *G02B 7/023* (2013.01); *G06F 1/163* (2013.01); *G09G 3/001* (2013.01);
(Continued)

(58) Field of Classification Search
CPC ......... G06F 3/013; G06F 1/163; G02B 7/023; G09G 3/001; G09G 2320/0606; G09G 2354/00
See application file for complete search history.

(56) References Cited

U.S. PATENT DOCUMENTS 11,543,667 B2 * 1/2023 Cheng ................ G02B 27/0093
11,551,376 B2 * 1/2023 Zachrisson ............... G06T 7/74
(Continued)

FOREIGN PATENT DOCUMENTS

JP       2006108868 A     4/2006
JP       2009523344 A     6/2009
WO    WO-2016072272 A1   5/2016

OTHER PUBLICATIONS

International Search Report for corresponding International Application No. PCT/JP2022/026988, dated Sep. 27, 2022, pp. 1-5.

*Primary Examiner* — Doon Y Chow
(74) *Attorney, Agent, or Firm* — Kilpatrick Townsend & Stockton LLP

(57) ABSTRACT

An image generation apparatus generates an adjustment screen 300 that is for allowing a user who is wearing a head-mounted display to adjust an inter-lens distance for the head-mounted display, and causes the head-mounted display to display the adjustment screen 300. In the adjustment screen 300, disposed is a lens image (for example, a left lens image 304a and a right lens image 304b) that indicates a lens in the head-mounted display and also disposed is a pupil image (for example, the left eye image 306a and the right (Continued)

eye image 306*b*) that indicates a pupil of the user in reference to an eye tracking result.

6 Claims, 11 Drawing Sheets

(51) Int. Cl.
    *G06F 1/16*         (2006.01)
    *G09G 3/00*         (2006.01)

(52) U.S. Cl.
    CPC . *G09G 2320/0606* (2013.01); *G09G 2354/00* (2013.01)

(56) References Cited

U.S. PATENT DOCUMENTS

| | | | |
|---|---|---|---|
| 11,960,643 B2 * | 4/2024 | Choi | H04N 13/344 |
| 12,008,723 B2 * | 6/2024 | Miller | G06F 1/163 |
| 2014/0078023 A1 * | 3/2014 | Ikeda | G02B 27/0025 345/8 |
| 2014/0375540 A1 | 12/2014 | Ackerman et al. | |
| 2020/0409459 A1 * | 12/2020 | Nishide | H04N 23/60 |
| 2022/0026724 A1 * | 1/2022 | Law | G02B 27/0176 |

* cited by examiner

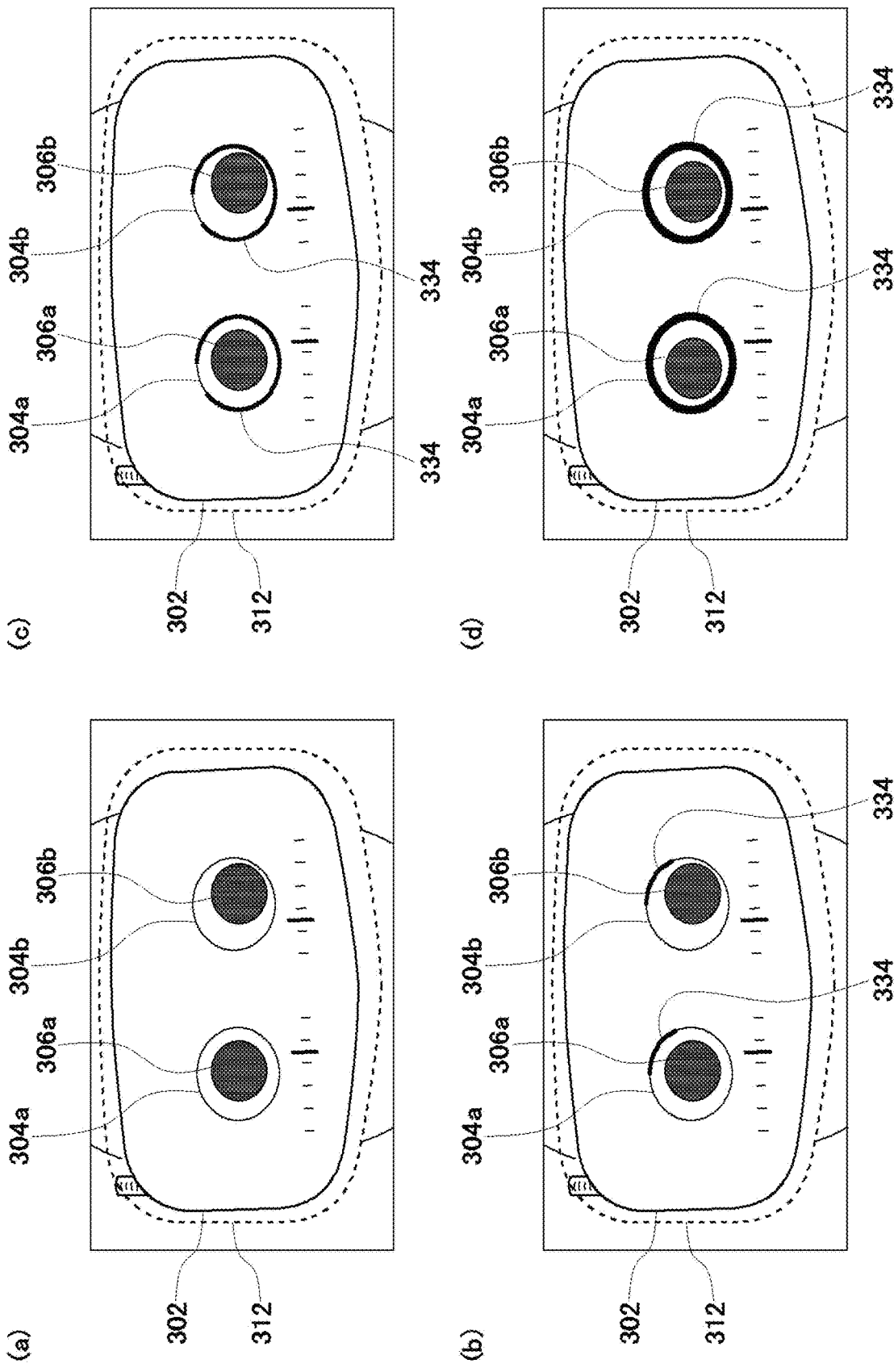

INFORMATION PROCESSING APPARATUS AND ADJUSTMENT SCREEN DISPLAY METHOD

CROSS REFERENCE TO RELATED APPLICATIONS

This application is a National Stage of International Application No. PCT/JP2022/026988 filed on Jul. 7, 2022, which claims priority from Japanese Patent Application 2022-023962, filed on Feb. 18, 2022. The contents of the above document is incorporated herein by reference in its entirety.

TECHNICAL FIELD

The present invention pertains to a data processing technique, and particularly pertains to an information processing apparatus and an adjustment screen display method.

BACKGROUND ART

Image display systems that enable a user who is wearing a head-mounted display (HMD) to appreciate a target space from any viewpoint are becoming widespread. For example, electronic content that realizes a virtual reality (VR) by taking a virtual three-dimensional space as a display target and causing a head-mounted display to display an image that corresponds to a user's line-of-sight direction is known. Using a head-mounted display makes it possible to increase a sense of immersion into a video and improve operability for an application such as a game. In addition, there has also been development of walkthrough systems which allow a user who is wearing a head-mounted display to virtually walk around in a space displayed as a video by physically moving.

SUMMARY

Technical Problem

In a case where the distance between the lens for a left eye and the lens for a right eye (hereinafter, also referred to as an "inter-lens distance") which are provided in a head-mounted display is not set appropriately, display by the head-mounted display may appear blurred to a user. Accordingly, the user needs to appropriately set the inter-lens distance for the head-mounted display.

The present invention is made in light of such a problem, and one objective of the present invention is to provide a technique for assisting setting of the inter-lens distance for a head-mounted display.

Solution to Problem

In order to solve the above-described problem, an information processing apparatus according to a certain aspect of the present invention includes an adjustment screen generation unit that generates an adjustment screen for allowing a user who is wearing a head-mounted display to adjust an inter-lens distance for the head-mounted display, and a display control unit that causes the head-mounted display to display the adjustment screen. The adjustment screen generation unit disposes, in the adjustment screen, a lens image indicating a lens in the head-mounted display and also disposes, in the adjustment screen, a pupil image that indicates a pupil of the user in reference to an eye tracking result.

Another aspect of the present invention is an adjustment screen display method. In this method, a computer executes a step for generating an adjustment screen for allowing a user who is wearing a head-mounted display to adjust an inter-lens distance for the head-mounted display, and a step for causing the head-mounted display to display the adjustment screen. In the adjustment screen, a lens image indicating a lens in the head-mounted display is disposed, and a pupil image that indicates a pupil of the user on the basis of an eye tracking result is also disposed.

Note that any combination of the above components or a representation of the present invention may be mutually converted between a system, a computer program, a recording medium onto which the computer program has been recorded in a readable manner, a data structure, etc., which are effective as aspects of the present invention.

Advantageous Effect of Invention

By virtue of the present invention, it is possible to assist setting of an inter-lens distance for a head-mounted display.

BRIEF DESCRIPTION OF DRAWINGS

FIG. 15(*a*), FIG. 15(*b*), FIG. 15(*c*), and FIG. 15(*d*) are views that illustrate examples of feedback objects on an adjustment screen.

DESCRIPTION OF EMBODIMENTS

Figure 1:
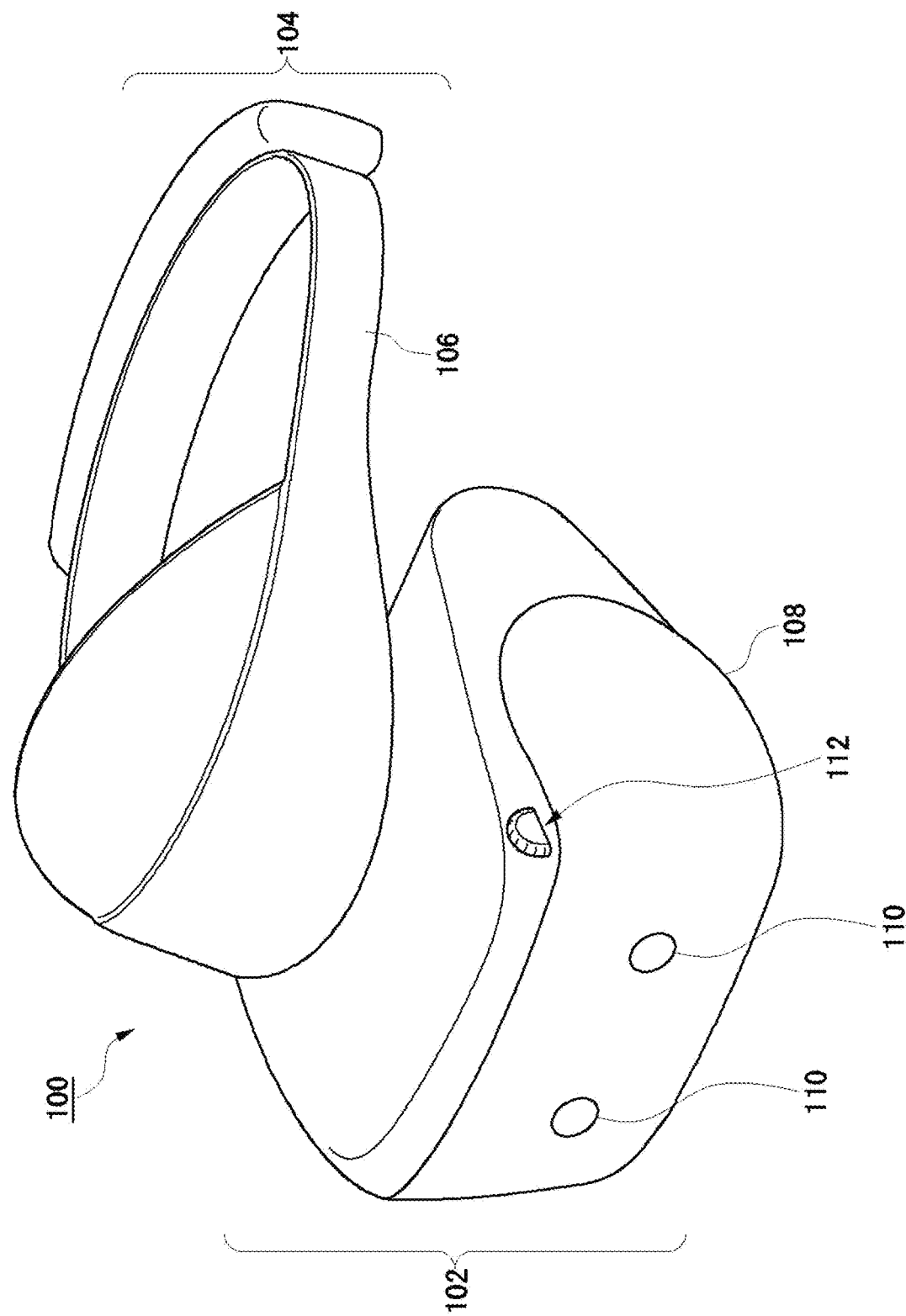
FIG. 1 is a view that illustrates an example of the appearance of a head-mounted display according to an embodiment.

The present embodiment pertains to an image display system that displays an application image on a head-mounted display that is worn on the head of a user. The head-mounted display may also be referred to as a VR headset. FIG. 1 is a view that illustrates an example of the appearance of a head-mounted display 100 according to an embodiment. The head-mounted display 100 is provided with an output mechanism section 102 and a mounting mechanism section 104. The mounting mechanism section 104 includes a mounting band 106 that realizes securing of an apparatus around a head by being worn by a user.

The output mechanism section 102 includes a housing 108 having such a shape that left and right eyes are covered in a state where a user has worn the head-mounted display 100, and is internally provided with a display panel that faces the eyes when worn. The display panel belonging to the head-mounted display 100 in the embodiment is assumed to lack transparency. In other words, the head-mounted display 100 in the embodiment is a light-opaque type head-mounted display.

The inside of the housing 108 is further provided with eyepiece lenses (a left lens 114 and a right lens 116 that are described below) that are positioned between the display panel and the user's eyes when the head-mounted display 100 is worn and enlarge the user's viewing angle. The head-mounted display 100 may further be provided with speakers or earphones at positions corresponding to the user's ears when worn. In addition, the head-mounted display 100 incorporates a motion sensor, and, for the head of a user who is wearing the head-mounted display 100, detects translational motion and rotational motion, as well as the position or orientation thereof at each point in time.

In addition, the head-mounted display 100 is provided with a stereo camera 110 at the front surface of the housing 108. The stereo camera 110 captures a video of the surrounding real space, by a field of view corresponding to the user's line of sight. If a captured image is caused to be immediately displayed, it is possible to realize what is generally called video see through in which the situation of the real space in the direction that the user is facing can be seen unchanged. Moreover, it is possible to realize augmented reality (AR) if a virtual object is drawn on an image of a real object appearing in a captured image. Note that the number of cameras that the image display system 10 is provided with is not limited to any specific number, and the head-mounted display 100 may be provided with one camera, or may be provided with three or more cameras.

In addition, the head-mounted display 100 is provided with an adjustment dial 112 on an upper section of the housing 108. The adjustment dial 112 is a member for adjusting the inter-lens distance for the head-mounted display 100. The user turns the adjustment dial 112 to thereby lengthen or shorten the inter-lens distance for the head-mounted display 100.

Figure 2:
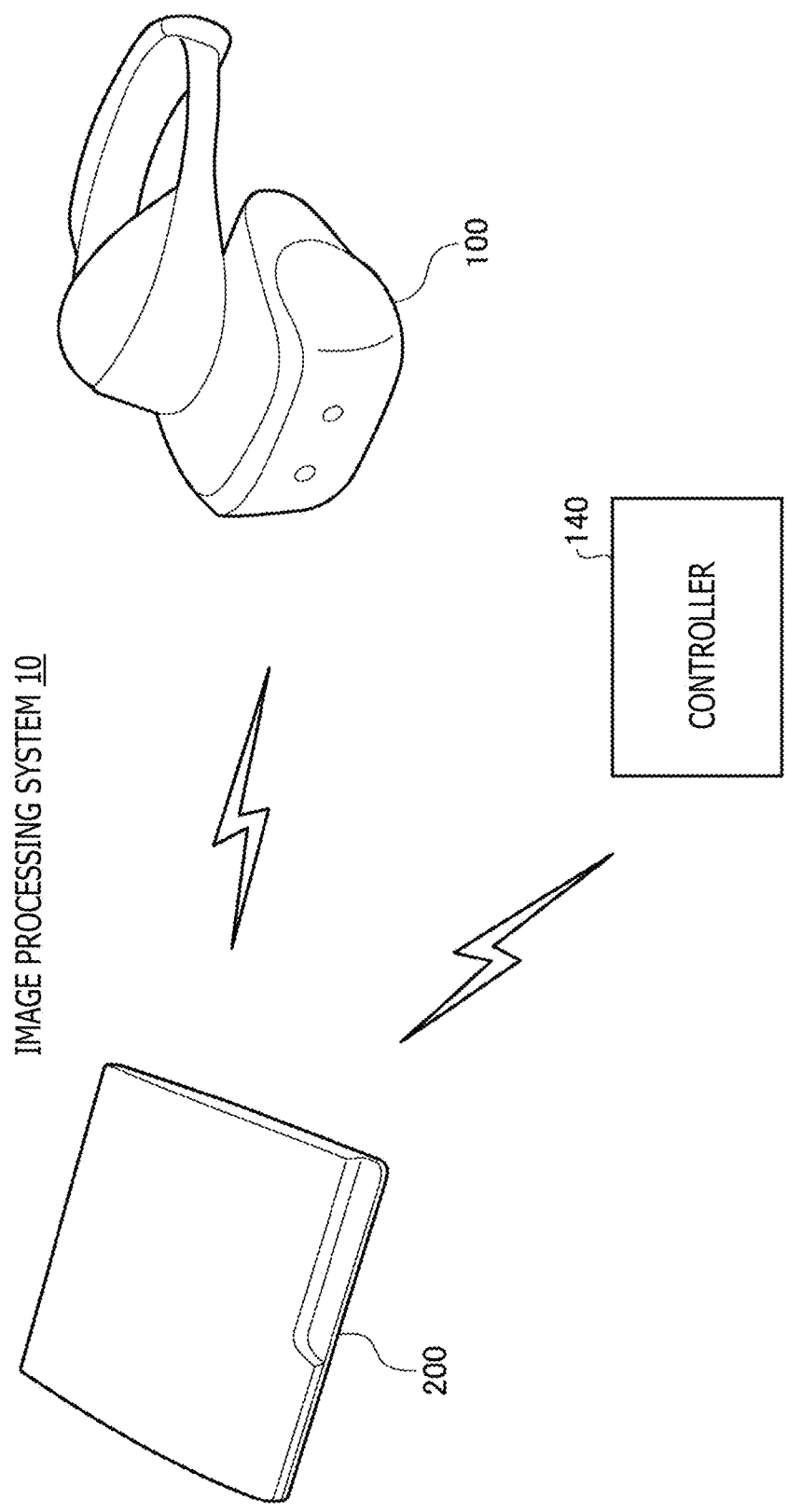
FIG. 2 is a view that illustrates an example of a configuration of an image display system according to the embodiment.

FIG. 2 illustrates an example of a configuration of an image display system 10 according to an embodiment. The image display system 10 includes the head-mounted display 100, an image generation apparatus 200, and a controller 140. The head-mounted display 100 is connected to the image generation apparatus 200 by wireless communication. The image generation apparatus 200 may also be connected to a server (not illustrated) via a network. In such a case, the server may provide the image generation apparatus 200 with data for an online application such as a game that a plurality of users can participate in via a network.

The image generation apparatus 200 is an information processing apparatus that, according to the position or orientation of the head of the user that is wearing the head-mounted display 100, identifies the position of a viewpoint or the direction of a line of sight, generates a display image such that a field of view that corresponds thereto is achieved, and outputs the display image to the head-mounted display 100. The image generation apparatus 200 may be a stationary game device, a personal computer (PC), or a tablet terminal. While the image generation apparatus 200 can execute various applications pertaining to VR or AR, in the embodiment, it is assumed that the image generation apparatus 200 generates a display image for a virtual world that is a game stage for causing an electronic game (hereinafter, may be referred to as a "VR game") to progress, and causes the head-mounted display 100 to display this display image.

Note that the image generation apparatus 200 may generate a moving image for the purpose of enjoyment or information provision, irrespective of whether for a virtual world or the real world, and cause the head-mounted display 100 to display this moving image. In addition, the image generation apparatus 200 may cause the head-mounted display 100 to display a panoramic image having a wide angle of view that is centered on a user's viewpoint, whereby it is possible to impart the user with a deep sense of immersion into the display world.

The controller 140 is an input apparatus (for example, a game controller), which is grasped by a user's hand and which is inputted with an operation by the user. An operation by the user includes an operation for controlling image generation in the image generation apparatus 200, and an operation for controlling image display in the head-mounted display 100. The controller 140 is connected to the image generation apparatus 200 by wireless communication, and transmits data indicating an operation by the user to the image generation apparatus 200. As a variation, one of or both the head-mounted display 100 and the controller 140 may be connected to the image generation apparatus 200 by wired communication that goes via a signal cable or the like.

Figure 3:
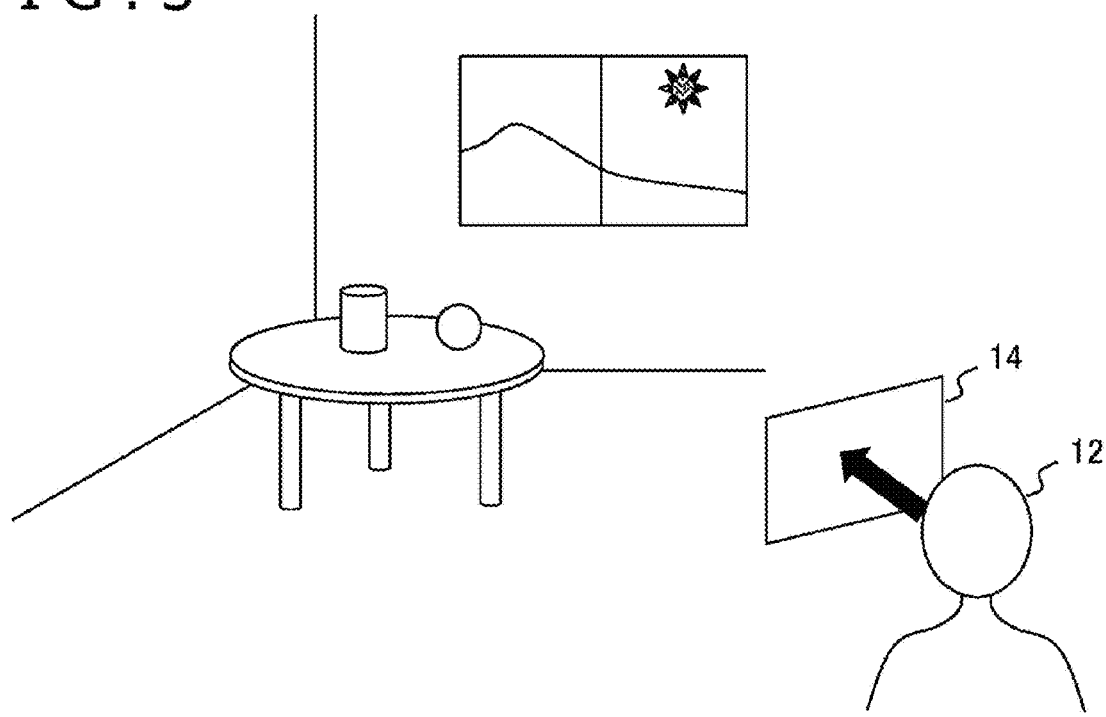
FIG. 3 is a view for describing an example of an image world that an image generation apparatus causes the head-mounted display to display.

FIG. 3 is a view for describing an example of an image world that the image generation apparatus 200 causes the head-mounted display 100 to display. In this example, a state in which a user 12 is in a room that is a virtual space has been created. As illustrated, objects such as walls, a floor, a window, a table, and objects on the table are disposed in a world coordinate system that defines the virtual space. In the world coordinate system, the image generation apparatus 200 defines a view screen 14 according to the viewpoint position or line of sight direction for the user 12, and represents an image of an object therein to draw a display image.

The image generation apparatus 200 obtains the viewpoint position or line of sight direction (hereinafter, these may be inclusively referred to as a "viewpoint") for the user 12 from the head-mounted display 100 at a predetermined rate, and causes the position or direction of the view screen 14 to change according to the viewpoint. As a result, it is possible to cause the head-mounted display 100 to display an image at a field of view corresponding to the viewpoint of a user. In addition, it is possible to allow the user 12 to stereoscopically view a virtual space if the image generation apparatus 200 generates a stereo image having parallax and causes left and right regions of the display panel in the head-mounted display 100 to display the stereo image. As a result, the user 12 can experience a virtual reality as if the user 12 were in the room that is in the display world.

Figure 4:
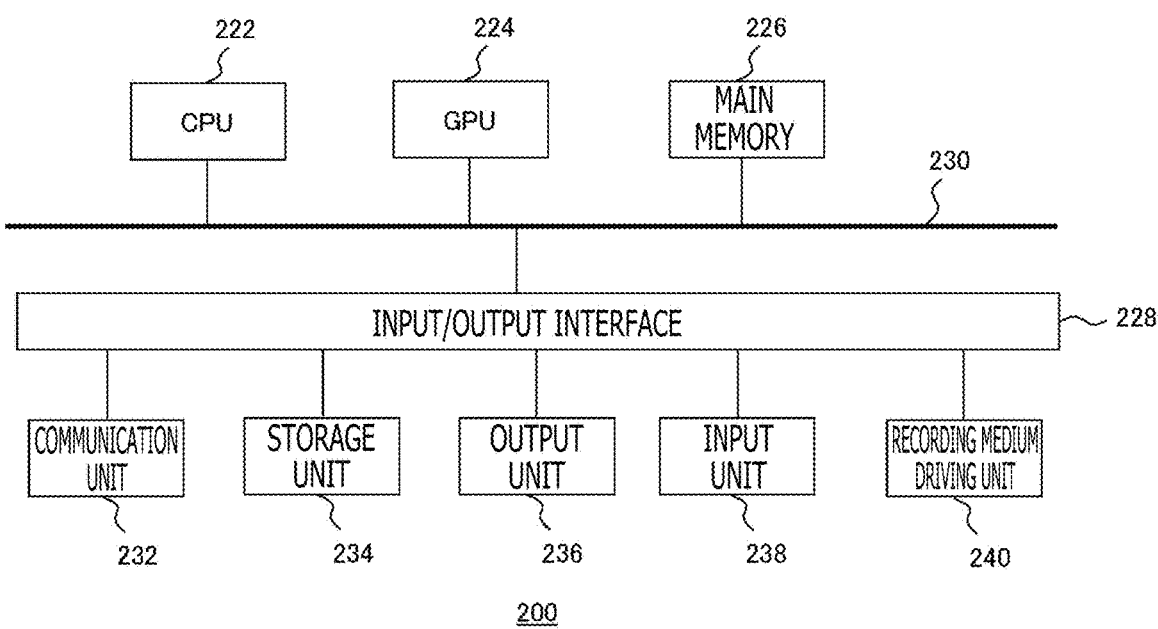
FIG. 4 is a view that illustrates an internal circuit configuration of the image generation apparatus.

FIG. 4 illustrates an internal circuit configuration of the image generation apparatus 200. The image generation apparatus 200 includes a central processing unit (CPU) 222, a graphics processing unit (GPU) 224, and a main memory 226. These units are connected to each other via a bus 230. An input/output interface 228 is also connected to the bus 230. A communication unit 232, a storage unit 234, an output unit 236, an input unit 238, and a recording medium driving unit 240 are connected to the input/output interface 228.

The communication unit 232 includes a peripheral interface such as for a universal serial bus (USB) or Institute of Electrical and Electronics Engineering (IEEE) 1394, or a network interface such as for a wired local area network (LAN) or a wireless LAN. The storage unit 234 includes, inter alia, a hard disk drive or a non-volatile memory. The output unit 236 outputs data to the head-mounted display 100. The input unit 238 accepts input of data from the head-mounted display 100, and also accepts input of data from the controller 140. The recording medium driving unit 240 drives a removable recording medium such as a magnetic disk, an optical disc, or a semiconductor memory.

The CPU 222 executes an operating system stored in the storage unit 234 and thereby controls the entirety of the image generation apparatus 200. In addition, the CPU 222 executes various programs (for example, a VR game application or the like) that have been read out from the storage unit 234 or a removable recording medium and loaded into the main memory 226, or downloaded via the communication unit 232. The GPU 224 has a geometry engine function and a rendering processor function, performs a drawing process in accordance with a drawing command from the CPU 222, and outputs a drawing result to the output unit 236. One of or both the CPU 222 and the GPU 224 can be referred to as a processor. The main memory 226 includes a random access memory (RAM), and stores data or a program that is necessary for processing.

Figure 5:
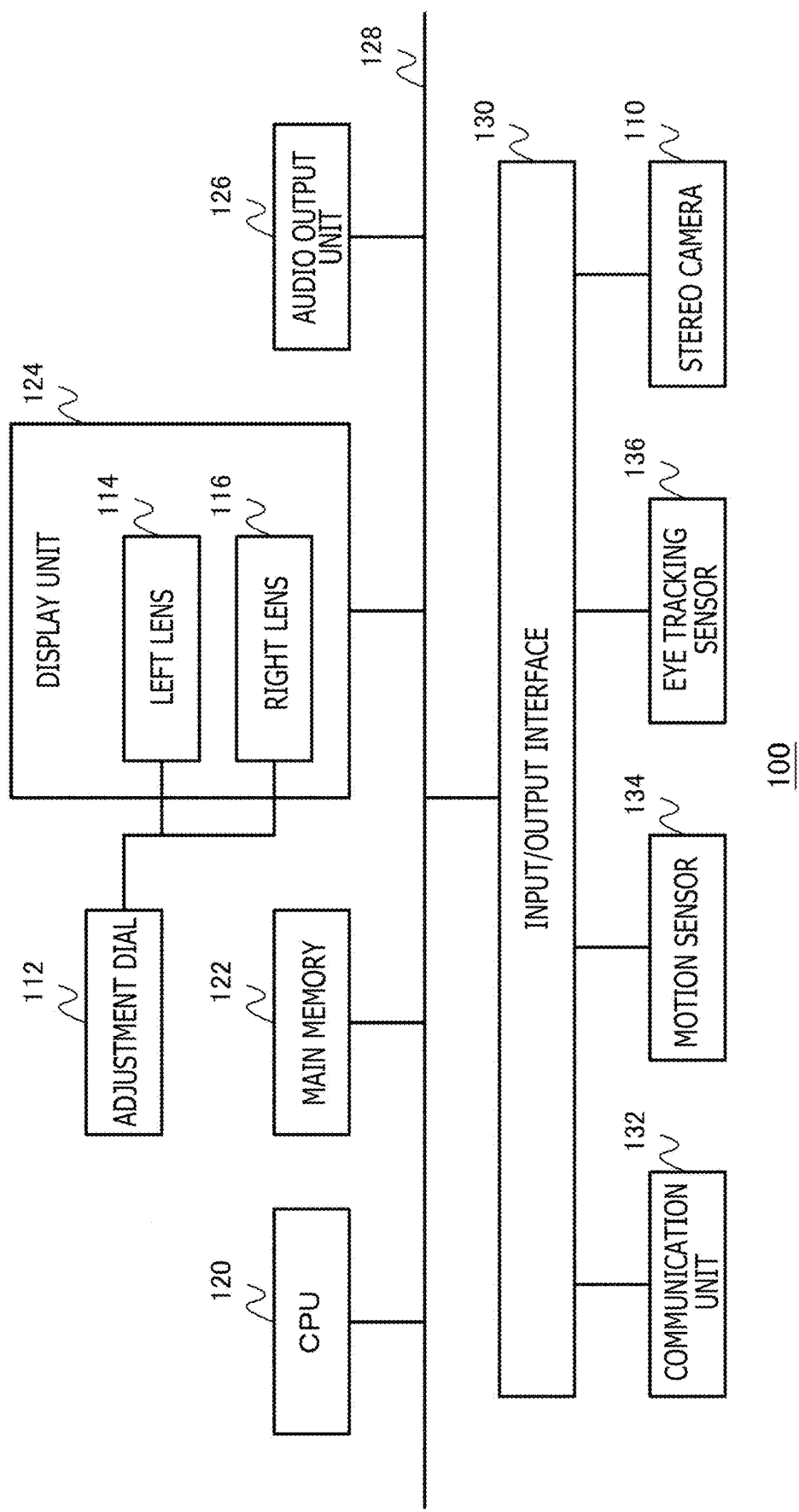
FIG. 5 is a view that illustrates an internal circuit configuration of the head-mounted display.

FIG. 5 is a view that illustrates an internal circuit configuration of the head-mounted display 100. The head-mounted display 100 includes a CPU 120, a main memory 122, a display unit 124, and an audio output unit 126. These units are connected to each other via a bus 128. An input/output interface 130 is also connected to the bus 128. A communication unit 132 that includes an interface for wireless communication, a motion sensor 134, an eye tracking sensor 136, and the stereo camera 110 are connected to the input/output interface 130.

The CPU 120 processes information obtained from each unit in the head-mounted display 100 via the bus 128, and also supplies the audio output unit 126 or the display unit 124 with audio data or a display image obtained from the image generation apparatus 200. The main memory 122 stores data or a program necessary for processing by the CPU 120.

The display unit 124 includes a display panel that is a liquid-crystal panel, an organic electroluminescence (EL) panel, or the like, and displays an image in front of the eyes of the user who is wearing the head-mounted display 100. The display unit 124 displays a pair of stereo images on a left eye display panel that is provided in front of the user's left eye and a right eye display panel that is provided in front of the user's right eye, to thereby realize stereoscopic vision.

The display unit 124 also includes a pair of lenses that are used for expanding the user's viewing angle and are positioned between the user's eyes and the display panel when the head-mounted display 100 is being worn. The pair of lenses include the left lens 114 and the right lens 116. The left lens 114 is provided between the left eye display panel and the user's left eye, and the right lens 116 is provided between the right eye display panel and the user's right eye. The adjustment dial 112 is mechanically or electrically connected to the left lens 114 and the right lens 116, and adjusts the inter-lens distance between the left lens 114 and the right lens 116. The inter-lens distance is, for example, the distance between the center of the left lens 114 and the center of the right lens 116.

The audio output unit 126 includes speakers or earphones provided at positions corresponding to the user's ears when the head-mounted display 100 is being worn, and allow the user to hear audio. The communication unit 132 is an interface for sending and receiving data to and from the image generation apparatus 200, and uses a known wireless communication technology such as Bluetooth (registered trademark) to realize communication.

The motion sensor 134 includes a gyro sensor and an acceleration sensor, and obtains an angular velocity or an acceleration of the head-mounted display 100. The eye tracking sensor 136 is a publicly known sensor that is used for eye tracking. Eye tracking can also be said to be line-of-sight measurement, and is a technique for detecting the position of, motion by, and line-of-sight direction for a user's pupil (could be said to be eyeball). For example, the eye tracking sensor 136 uses infrared rays or the like to detect the position of and motion by a user's pupil.

As illustrated in FIG. 1, the stereo camera 110 is a pair of video cameras for capturing, from left and right viewpoints, the surrounding real space by a field of view that corresponds to the user's viewpoint. An image that is captured by the stereo camera 110 and in which the space surrounding a user appears may be referred to below as a "camera image." A camera image can be said to be an image in which the real space in the user's line-of-sight direction (typically, in front of the user) appears, and can also be said to be an image in which an object which is present in the user's line-of-sight direction appears.

Data transmitted from the head-mounted display 100 to the image generation apparatus 200 via the communication unit 132 includes the following content.

(1) A measurement value obtained by the motion sensor 134;
(2) A measurement value obtained by the eye tracking sensor 136;
(3) Data regarding an image (camera image) that has been captured by the stereo camera 110; and
(4) An amount of rotation by and a rotation angle for the adjustment dial 112.

Description will be given regarding features of the image display system 10 according to the embodiment. The image display system 10 provides an adjustment screen which is a user interface that allows a user who is wearing the head-mounted display 100 to adjust the inter-lens distance for the head-mounted display 100. Lens images indicating the left lens 114 and the right lens 116 of the head-mounted display 100 are disposed in the adjustment screen, according to the orientation of the head-mounted display 100. In addition, pupil images indicating the user's pupils (left eye and right eye) are disposed in the adjustment screen, in reference to an eye tracking result. As a result, assistance is given such that adjustment of the inter-lens distance for the head-mounted display 100 by the user is facilitated.

Figure 6:
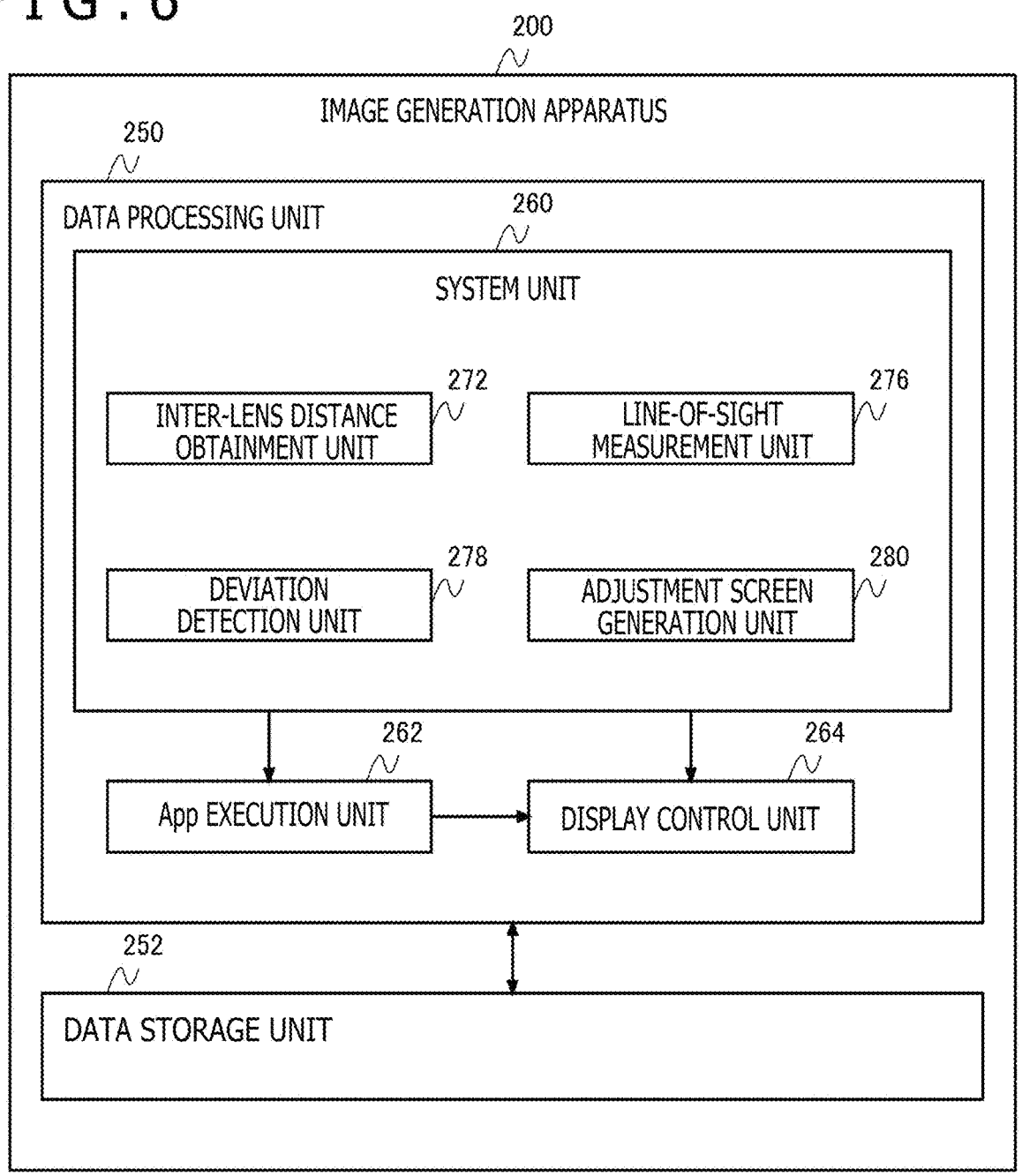
FIG. 6 is a block view that illustrates functional blocks in the image generation apparatus.

FIG. 6 is a block view that illustrates functional blocks in the image generation apparatus. The image generation apparatus 200 executes various kinds of information processing such as for progress in a VR game or communication with a server, but description is primarily given below for functional blocks relating to adjustment of the inter-lens distance for the head-mounted display 100.

The plurality of functional blocks illustrated in FIG. 6 can be realized in terms of hardware by a configuration that has, inter alia, the CPU 222, the GPU 224, the main memory 226, and the storage unit 234 that are illustrated in FIG. 4, and can be realized in terms of software by a computer program that implements the functionality of the plurality of functional blocks. Accordingly, a person skilled in the art would understand that these functional blocks can be realized in various forms by only hardware, only software, or a combination thereof; the form of realizing these functional blocks is not limited to any of these.

The image generation apparatus 200 is provided with a data processing unit 250, and a data storage unit 252. The data storage unit 252 corresponds to the storage unit 234 in FIG. 4, and stores data that is referred to or updated by the data processing unit 250. For example, the data storage unit 252 stores image data for each element disposed in an adjustment screen, which is described below with reference to FIG. 7 and the like.

The data processing unit 250 executes various kinds of data processing. The data processing unit 250 transmits and receives data to and from the head-mounted display 100 and the controller 140, via the communication unit 232, the output unit 236, and the input unit 238 illustrated in FIG. 4. For example, the data processing unit 250 obtains a camera image or sensor data that is transmitted from the head-mounted display 100, and obtains data that pertains to an operation by the user and that is transmitted from the controller 140.

The data processing unit 250 includes a system unit 260, an App execution unit 262, and a display control unit 264. The functions of the plurality of functional blocks included in the data processing unit 250 may be implemented by a computer program. It may be that a processor in the image generation apparatus 200 (for example, the CPU 222 and the GPU 224) reads out the abovementioned computer program which is stored in storage in the image generation apparatus 200 (for example, the storage unit 234) into the main memory 226 and executes the computer program to thereby exhibit the functionality of the above-described plurality of functional blocks.

The App execution unit 262 reads out data pertaining to an application (a VR game in the embodiment) selected by the user from the data storage unit 252, and executes the application selected by the user. In reference to a camera image obtained by the system unit 260, the position and orientation of the head-mounted display 100 that are obtained by the system unit 260, and the user's line-of-sight direction that is measured by the system unit 260, the App execution unit 262 generates a VR image indicating a result of executing the VR game. The VR image includes a left eye image and a right eye image.

The display control unit 264 transmits data for various VR images generated by the App execution unit 262 to the head-mounted display 100 and causes the display unit 124 in the head-mounted display 100 to display the VR images. The display unit 124 in the head-mounted display 100 displays the left eye image on the left eye display panel and displays the right eye image on the right eye display panel.

The system unit 260 executes processing for a system that pertains to the head-mounted display 100. The system unit 260 provides a common service to a plurality of applications (for example, a plurality of VR games) that are for the head-mounted display 100. The common service includes provision of camera images, provision of information regarding the position and orientation of the head-mounted display 100, and provision of line-of-sight measurement results, for example. In addition, the system unit 260 executes processing pertaining to basic settings for the head-mounted display 100, and executes processing for assisting adjustment of the inter-lens distance in the embodiment.

The system unit 260 includes an inter-lens distance obtainment unit 272, a line-of-sight measurement unit 276, a deviation detection unit 278, and an adjustment screen generation unit 280.

The inter-lens distance obtainment unit 272 obtains the inter-lens distance for the head-mounted display 100, in reference to the amount of rotation or rotation angle of the adjustment dial 112, which is transmitted from the head-mounted display 100.

In reference to a detection value from the eye tracking sensor 136 in the head-mounted display 100, the line-of-sight measurement unit 276 uses a publicly known eye tracking technology to detect the position of, motion by, and line-of-sight direction of a pupil of the user who is wearing the head-mounted display 100.

The deviation detection unit 278 detects the magnitude of deviation between the detection value from the eye tracking sensor 136 in the head-mounted display 100 and the position of the user's pupil that is detected by the line-of-sight measurement unit 276.

The adjustment screen generation unit 280 generates data for an adjustment screen that is for allowing a user to adjust the inter-lens distance for the head-mounted display 100. As described below in relation to FIG. 7, the adjustment screen generation unit 280 disposes images which indicate the lenses of the head-mounted display 100, in the adjustment screen. In addition, the adjustment screen generation unit 280 also disposes, in the adjustment screen, images that indicate the user's pupils, in reference to results of eye tracking by the line-of-sight measurement unit 276.

The adjustment screen generation unit 280 outputs the generated data for the adjustment screen to the display control unit 264. The display control unit 264 transmits the data for the adjustment screen generated by the adjustment screen generation unit 280 to the head-mounted display 100, and causes the display unit 124 in the head-mounted display 100 to display the adjustment screen.

Figure 7:
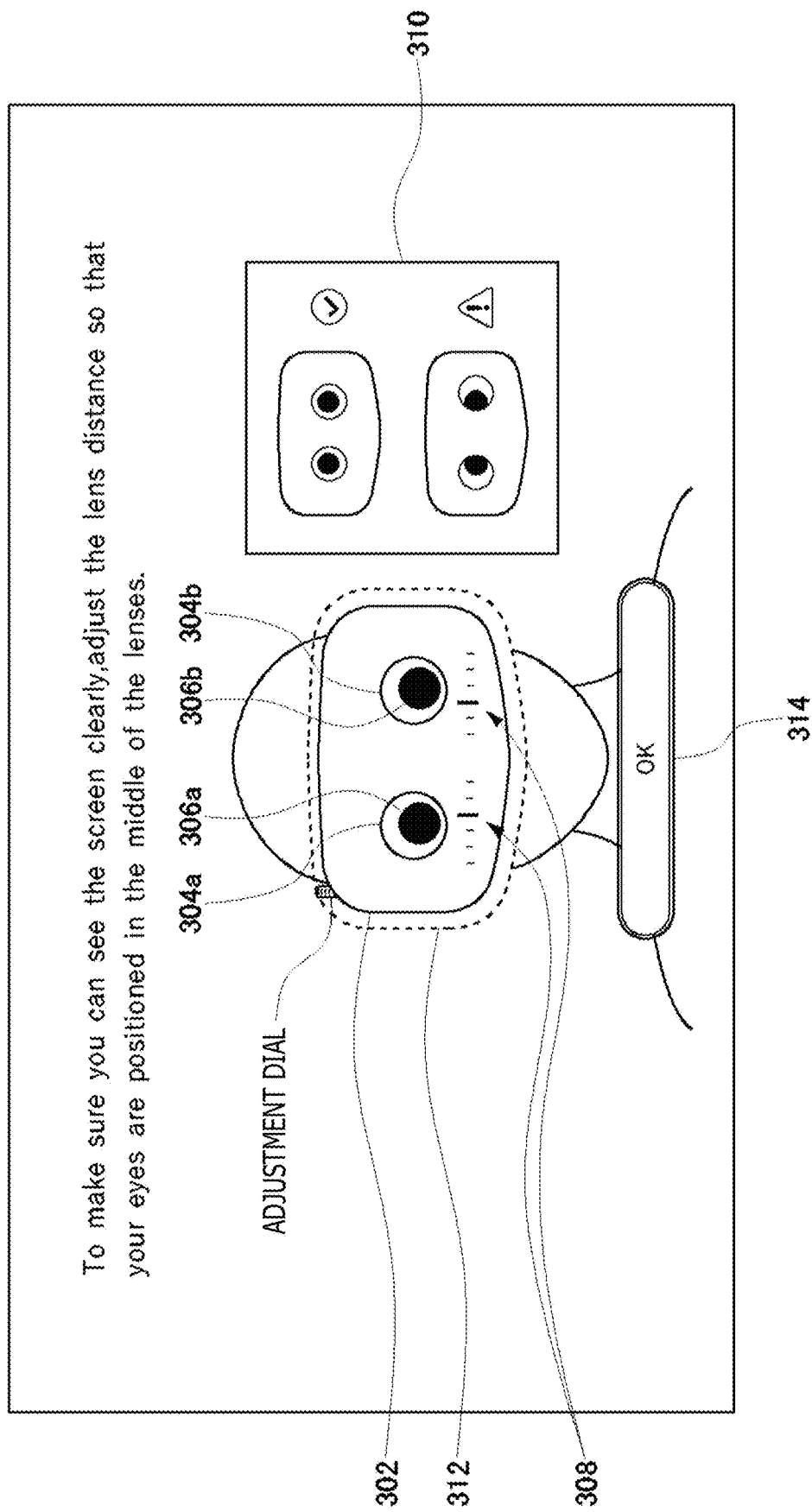
FIG. 7 is a view that illustrates an example of an adjustment screen.

FIG. 7 illustrates an example of an adjustment screen 300. The adjustment screen 300 is a user interface for indicating as if the figure of the user wearing the head-mounted display 100 is themselves appearing in a mirror. The adjustment screen generation unit 280 disposes a left eye image 306a, which indicates the user's left eye, at a position on the adjustment screen 300 corresponding to the position of the user's left eye detected by the line-of-sight measurement unit 276. The adjustment screen generation unit 280 disposes a right eye image 306b, which indicates the user's right eye, at a position on the adjustment screen 300 corresponding to the position of the user's right eye detected by the line-of-sight measurement unit 276. In a case of generically referring to the left eye image 306a and the right eye image 306b below, reference may be given to pupil images.

The adjustment screen generation unit 280 disposes an HMD image 302, which illustrates the head-mounted display 100, in the adjustment screen 300. The HMD image 302 includes a left lens image 304a that indicates the left lens 114 and a right lens image 304b that indicates the right lens 116. The left lens image 304a and the right lens image 304b may be images for indicating as if portions corresponding to the left lens 114 and the right lens 116 have been carved out, in the HMD image 302. When the position or orientation of the HMD image 302 changes, the positions of the left lens image 304a and the right lens image 304b also change. Note that the positions of each element in the adjustment screen 300 have positions resulting from a left-right inversion in order to indicate as if such elements are appearing in a mirror. In a case of generically referring to the left lens image 304a and the right lens image 304b below, reference may be simply given to a lens image.

When a user uses the adjustment dial 112 to change the inter-lens distance between the left lens 114 and the right lens 116, the adjustment screen generation unit 280 updates the adjustment screen 300 such that the interval between left lens image 304a and the right lens image 304b widens, or such that the interval narrows. Inter-lens distance indicators 308 are a pair of objects that suggest the magnitude of the inter-lens distance. In a case where the inter-lens distance is changed, the adjustment screen generation unit 280 updates the adjustment screen 300 such that the interval between the inter-lens distance indicators 308 widens or narrows, in tandem with the left lens image 304a and the right lens image 304b.

In the embodiment, the best positions for the left lens 114 and the right lens 116 are at locations where the center position of the left lens 114 matches the center position of the user's left eye and the center position of the right lens 116 matches the center position of the user's right eye. The adjustment screen 300 is configured to prompt the user to make such adjustments that the left lens 114 and the right lens 116 approach the best positions.

Specifically, the size of the left lens image 304a is designed such that the entirety of the left eye image 306a fits within a circle for the left lens image 304a, if deviation between the center of the left lens image 304a and the center of the left eye image 306a is within a predetermined threshold. In other words, the size of the left lens image 304a is designed such that at least a portion of the left eye image 306a protrudes from the circle for the left lens image 304a (is hidden behind the HMD image 302 on the screen) in a case where the abovementioned deviation exceeds the abovementioned threshold.

Similarly, the size of the right lens image 304b is designed such that the entirety of the right eye image 306b fits within a circle for the right lens image 304b, if deviation between the center of the right lens image 304b and the center of the right eye image 306b is within a predetermined threshold. In other words, the size of the right lens image 304b is designed such that at least a portion of the right eye image 306b protrudes from the circle for the right lens image 304b (is hidden behind the HMD image 302 on the screen) in a case where the abovementioned deviation exceeds the abovementioned threshold. The abovementioned thresholds that pertain to deviation may be determined by means of experimentation using the image display system 10 or the knowledge of a developer. The thresholds in the embodiment are ±3 millimeters for both left and right.

In addition, a normal range 312 (a range indicated by a broken line in FIG. 7), which indicates a range of correct positions for the HMD image 302, is set in the adjustment screen 300. The normal range 312 can also be said to be a range for correct worn positions for the head-mounted display 100. The adjustment screen generation unit 280 may set the normal range 312 based on the positions of the left eye image 306a and the right eye image 306b. The size of the normal range 312 may be designed such that a portion of the HMD image 302 departs from the normal range 312 in a case where deviation between the center of a lens image and the center of a pupil image exceeds a predetermined threshold (for example, ±3 millimeters). In addition, the size of the normal range 312 may be designed such that a portion of the HMD image 302 departs from the normal range 312 in a case where deviation between an alignment of the left and right lens images and an alignment of the left and right pupil images is greater than or equal to a predetermined threshold (for example, ±3 degrees).

Note that the adjustment screen generation unit 280 may determine that the position of the user's left pupil is in an appropriate range in a case where the center of the user's left pupil detected by the line-of-sight measurement unit 276 is positioned within the range of a circle having a radius of approximately 3 millimeters from the center of the left lens 114 in the head-mounted display 100. Similarly, the adjustment screen generation unit 280 may determine that the position of the user's right pupil is in an appropriate range in a case where the center of the user's right pupil detected by the line-of-sight measurement unit 276 is positioned within the range of a circle having a radius of approximately 3 millimeters from the center of the right lens 116 in the head-mounted display 100.

The adjustment screen generation unit 280 disposes a correct/incorrect example 310 in the adjustment screen 300. Disposed in an upper level of the correct/incorrect example 310 is an image that illustrates an example of a correct positional relation between the left lens image 304a, the right lens image 304b, the left eye image 306a, and the right eye image 306b. In addition, disposed in a lower level of the correct/incorrect example 310 is an image that illustrates an example of an incorrect positional relation between the left lens image 304a, the right lens image 304b, the left eye image 306a, and the right eye image 306b. The lower level in the correct/incorrect example 310 illustrates an example in which the inter-lens distance has been widened too much.

In the adjustment screen 300, adjustment ends when the left eye image 306a fits within the circle for the left lens image 304a and the right eye image 306b fits within the circle for the right lens image 304b. When adjustment ends, the user selects (presses) the end button 314. Note that it may be that the end button 314 is hidden in the adjustment screen 300 initially, and the adjustment screen generation unit 280 displays the end button 314 when the position and orientation of the head-mounted display 100 as well as the position of the user's pupils are correctly adjusted.

Figure 8:
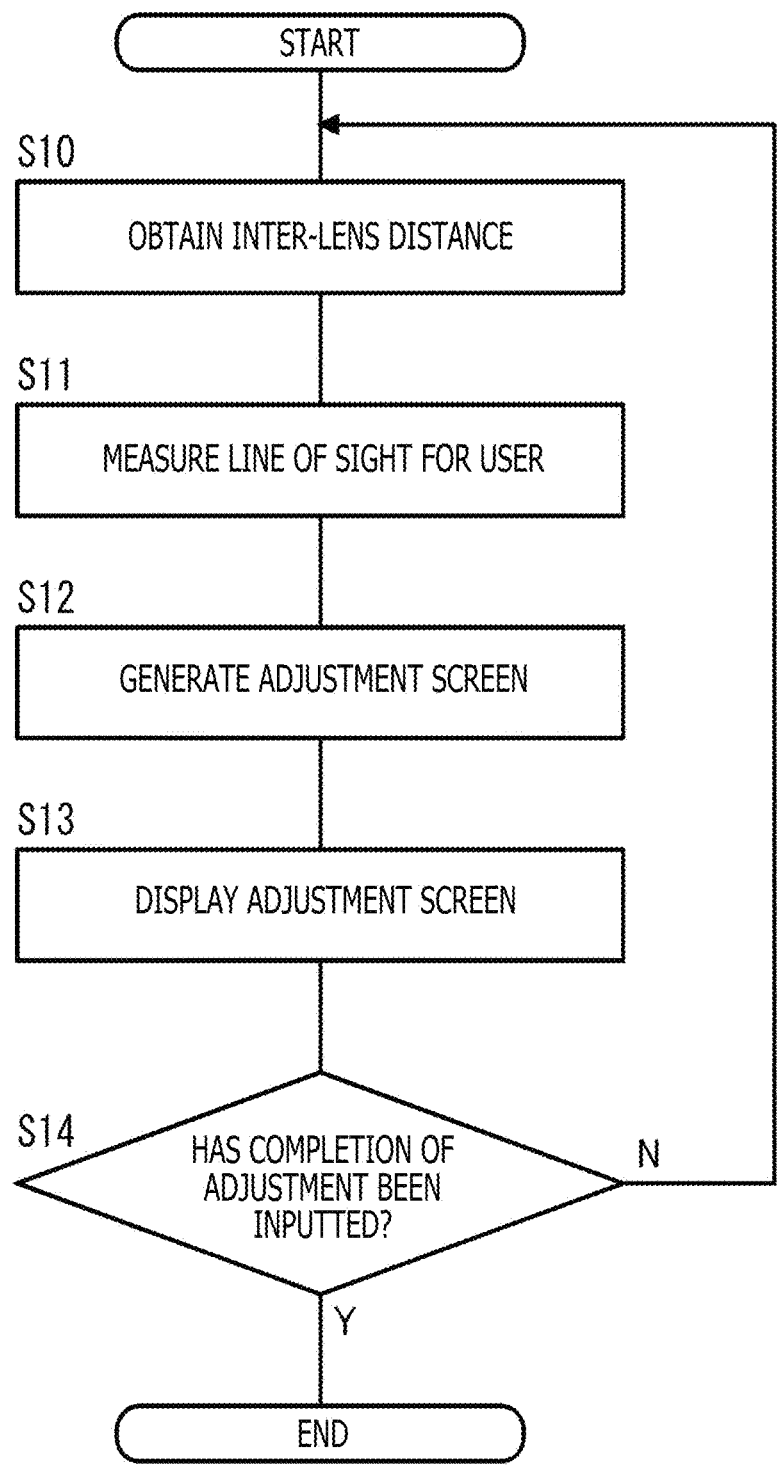
FIG. 8 is a flow chart that illustrates operation by the image generation apparatus.

Operation by the image generation apparatus 200 according to the above configuration will be described. FIG. 8 is a flow chart that illustrates operation by the image generation apparatus 200. FIG. 8 illustrates operation of an inter-lens distance adjustment assistance process that is executed in a case where the user wearing the head-mounted display 100 has used the controller 140 to select a menu item for adjusting the inter-lens distance, from among a plurality of settings menu items for the head-mounted display 100 that are provided by the image generation apparatus 200.

The inter-lens distance obtainment unit 272 in the image generation apparatus 200 obtains the inter-lens distance for the head-mounted display 100, in reference to the amount of rotation or rotation angle of the adjustment dial 112 in the head-mounted display 100 (S10).

In reference to a measurement value obtained by the eye tracking sensor 136 in the head-mounted display 100, the line-of-sight measurement unit 276 in the image generation apparatus 200 detects the positions of, motion by, and a line-of-sight directions for the pupils of the user wearing the head-mounted display 100 (S11). In S11, the deviation detection unit 278 in the image generation apparatus 200 detects deviation between the positions of the lens in the head-mounted display 100 and the positions of the user's pupils, and specifically detects the magnitude of deviation between an alignment of the left lens 114 and the right lens 116 in the head-mounted display 100 and an alignment of the user's left and right pupils.

The adjustment screen generation unit 280 in the image generation apparatus 200 generates data for an adjustment screen in reference to, inter alia, the inter-lens distance for the head-mounted display 100 obtained in S10, the positions of the user's pupils measured in S11, and the deviation detected in S12 that is between the positions of the lenses in the head-mounted display 100 and the positions of the user's pupils (S12). The display control unit 264 in the image generation apparatus 200 causes the head-mounted display 100 to display the adjustment screen (S13).

While viewing the adjustment screen 300 that is displayed by the head-mounted display 100, the user adjusts the position or orientation (can also be said to be the fit) of the head-mounted display 100 or turns the adjustment dial 112 in the head-mounted display 100, such that the left eye image 306*a* fits within the circle for the left lens image 304*a* and the right eye image 306*b* fits within the circle for the right lens image 304*b*. The user selects the end button 314 in the adjustment screen 300 when adjustment of the inter-lens distance ends.

When the end button 314 in the adjustment screen 300 is selected (Y in S14), the display control unit 264 causes display of the adjustment screen 300 to end, and the image generation apparatus 200 ends the inter-lens distance adjustment assistance process. If the end button 314 is not selected (N in S14), S10 is returned to. While processing for S10 through S13 is repeated, the adjustment screen generation unit 280 successively updates the display content of the adjustment screen 300 in response to, inter alia, change of the position or orientation of the head-mounted display 100 or change of the inter-lens distance.

For example, in a case where the position or orientation of the head-mounted display 100 has changed, the deviation detection unit 278 detects deviation between the position of the lenses in the head-mounted display 100 after the change and the positions of the user's pupils, in other words, detects the positional relation between the positions of the lenses in the head-mounted display 100 after the change and the positions of the user's pupils. According to deviation (the positional relation) between the positions of lenses and pupils that is successively detected by the deviation detection unit 278, the adjustment screen generation unit 280 generates a new adjustment screen 300 that results from changing the positions of the left lens image 304*a* and the right lens image 304*b*. In addition, in a case where the user has performed an operation for changing the positions of the lenses (in other words, rotation of the adjustment dial 112), the adjustment screen generation unit 280 generates a new adjustment screen 300 in which the positions of the left lens image 304*a* and the right lens image 304*b* have been changed.

Figure 9:
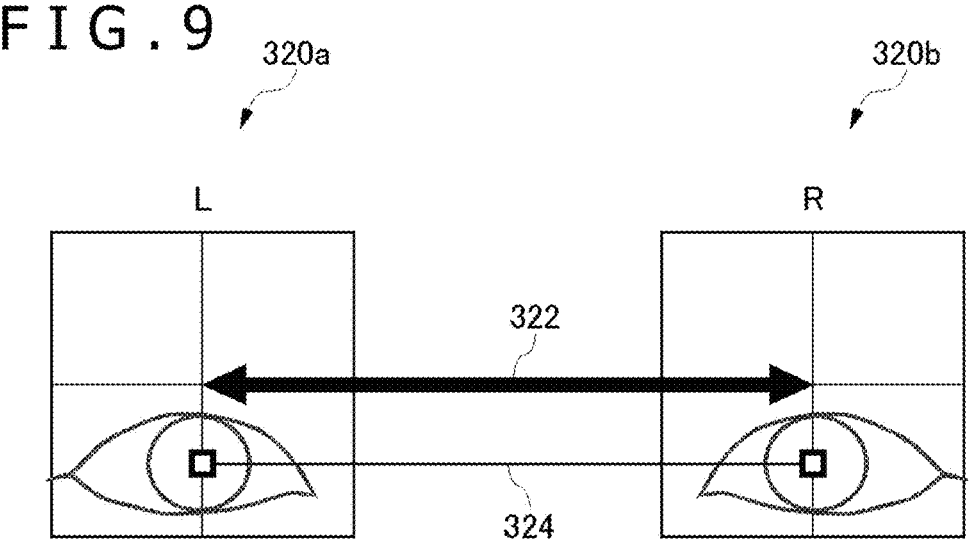
FIG. 9 is a view that illustrates an example of deviation detection by a deviation detection unit.

FIG. 9 illustrates an example of deviation detection by the deviation detection unit 278. In the embodiment, the deviation detection unit 278 maps the position of the user's left eye (specifically, the position of the center of the pupil) that is detected by the line-of-sight measurement unit 276 to a left-lens region 320*a* that corresponds to the left lens 114. In addition, the deviation detection unit 278 maps the position of the user's right eye that is detected by the line-of-sight measurement unit 276 to a right-lens region 320*b* that corresponds to the right lens 116. The deviation detection unit 278 sets an LSD (Lens Separation Distance) line 322 that joins the center of the left-lens region 320*a* with the center of the right-lens region 320*b*, and an IPD (Inter Pupillary Distance) line 324 that joins the center of the user's left pupil with the center of the right pupil. In the example in FIG. 9, the user's left and right pupils are detected to be lower than positions where they should properly be.

Figure 10:
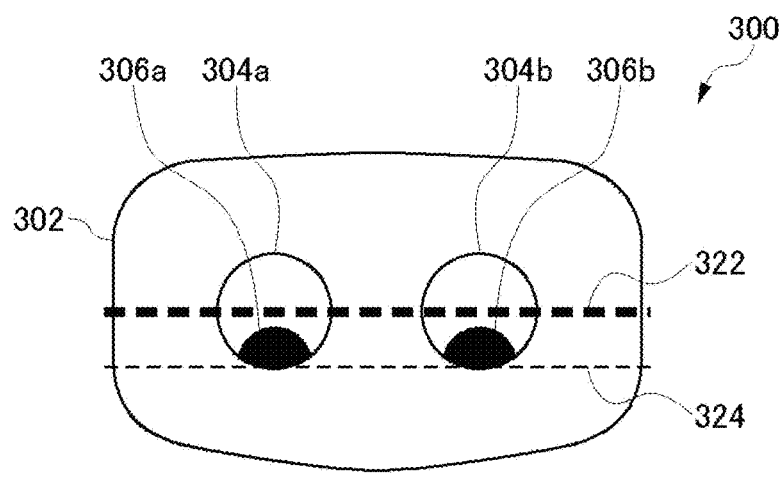
FIG. 10 is a view that schematically illustrates an adjustment screen that corresponds to FIG. 9.

FIG. 10 is a view that schematically illustrates an adjustment screen 300 that corresponds to FIG. 9. In the adjustment screen 300, the positions of the left eye image 306*a* and the right eye image 306*b* are immobilized. In other words, the HMD image 302 (including the left lens image 304*a* and the right lens image 304*b*) changes in position and inclination in the adjustment screen 300. Accordingly, in the adjustment screen 300 in FIG. 9, the HMD image 302 is displayed deviated upward from the position where the HMD image 302 should properly be. Note that the LSD line 322 and the IPD line 324 are hidden in the adjustment screen 300 in FIG. 9.

Figure 11:
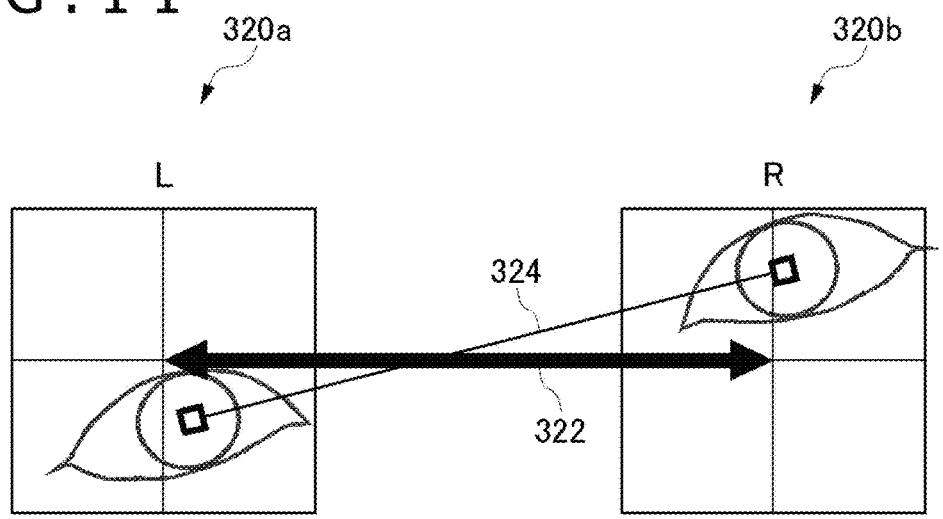
FIG. 11 is a view that illustrates an example of deviation detection by the deviation detection unit.

FIG. 11 illustrates an example of deviation detection by the deviation detection unit 278. In the example in FIG. 11, the user's left and right pupils are detected as inclined upwardly on the right.

Figure 12:
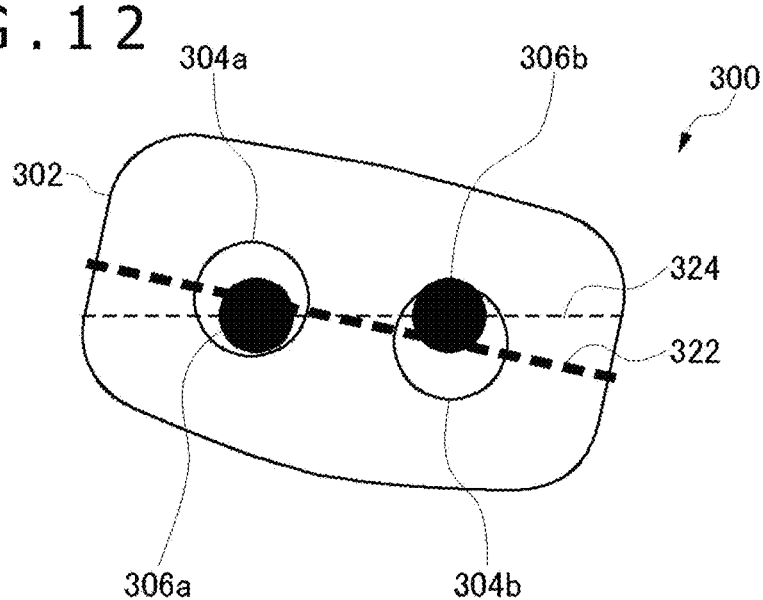
FIG. 12 is a view that schematically illustrates an adjustment screen that corresponds to FIG. 11.

FIG. 12 schematically illustrates an adjustment screen 300 that corresponds to FIG. 11. In the adjustment screen 300 in FIG. 12, the HMD image 302 is displayed as inclined upwardly on the left.

Figure 13:
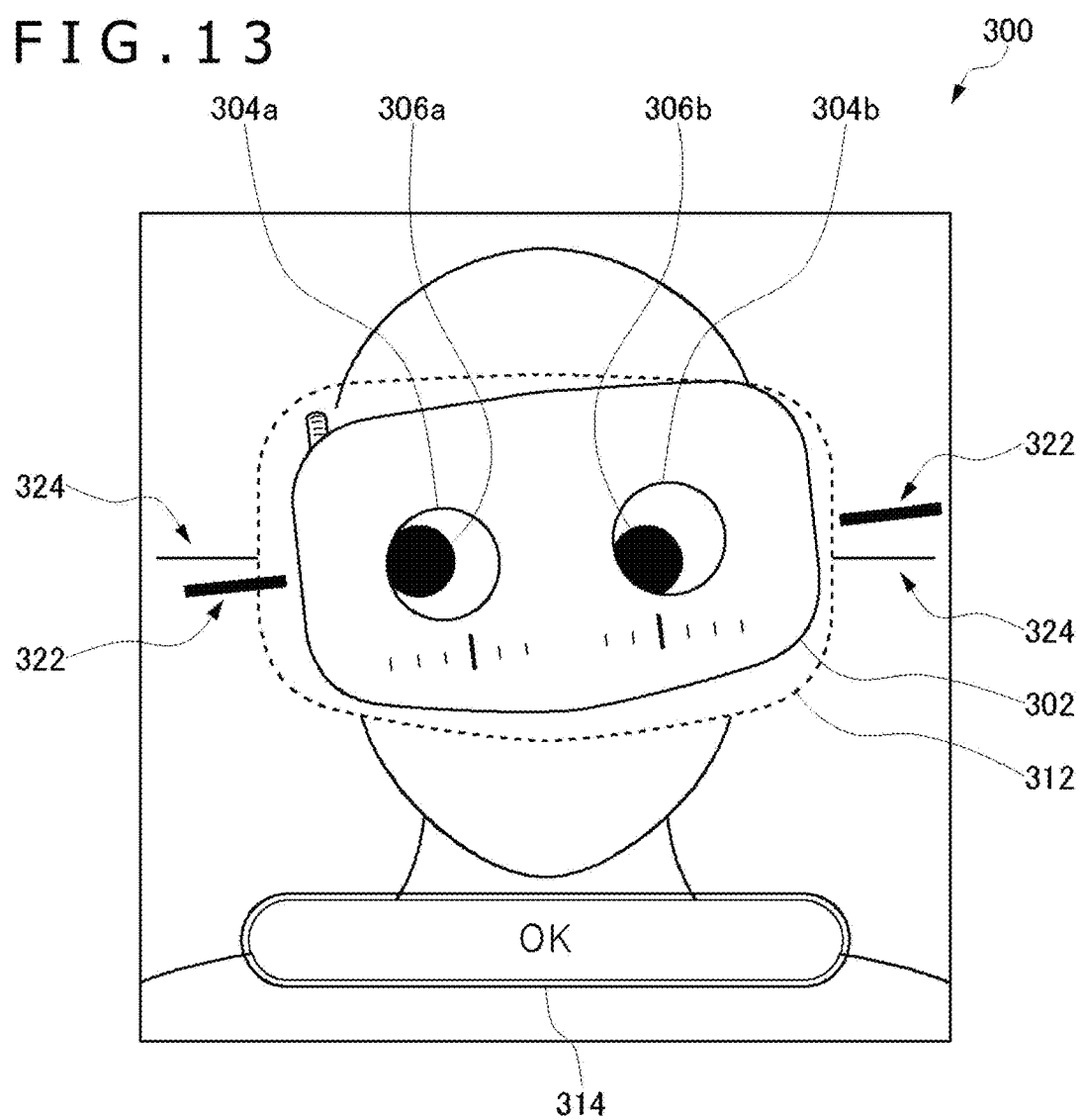
FIG. 13 is a view that illustrates an example of an adjustment screen in a case where there is a large amount of inclination by the head-mounted display.

FIG. 13 illustrates an example of the adjustment screen 300 in a case where there is a large amount of inclination by the head-mounted display 100. The adjustment screen generation unit 280 in the image generation apparatus 200 causes the adjustment screen 300 to display content suggesting deviation in a case where the magnitude of deviation between the positions of the lenses in the head-mounted display 100 and the positions of the user's pupils is greater than or equal to a predetermined threshold.

Specifically, as the magnitude of the deviation between the positions of the lenses in the head-mounted display 100 and the positions of the user's pupils, the deviation detection unit 278 detects an angle formed between the LSD line 322 and the IPD line 324. As illustrated in FIG. 13, if the angle formed between the LSD line 322 and the IPD line 324 is greater than or equal to a predetermined threshold, the adjustment screen generation unit 280 also disposes the LSD line 322 and the IPD line 324 in the adjustment screen 300 as content that suggests deviation. In other words, the adjustment screen generation unit 280 makes the LSD line 322 and the IPD line 324 which are set by the deviation detection unit 278 visible in the adjustment screen 300. The abovementioned thresholds that pertain to deviation may be determined by means of experimentation using the image display system 10 or the knowledge of a developer. The threshold is 3 degrees in the embodiment.

By virtue of the image generation apparatus 200 according to the embodiment, the adjustment screen 300 that includes lens images and pupil images is provided to a user who is wearing the head-mounted display 100, whereby it is possible to assist setting of an appropriate inter-lens distance for the head-mounted display 100. In addition, in a case where a user changes the lens positions in the head-mounted display 100, the positions of the lens images in the adjustment screen 300 are changed, whereby it is possible to effectively assist setting of an appropriate inter-lens distance.

In addition, by virtue of the image generation apparatus 200 according to the embodiment, the position of the lens images in the adjustment screen 300 is changed in a case where the orientation of the head-mounted display 100 has changed and thus the positional relation between the lenses in the head-mounted display 100 and the user's pupils has changed. As a result, it is possible to assist appropriate adjustment of the orientation of the head-mounted display 100. In addition, in a case where deviation between the positions of lenses in the head-mounted display 100 and the positions of the user's pupils has become high, it is possible to cause content suggesting that deviation is high to be displayed in the adjustment screen 300, and thereby prompt the user to resolve the deviation between the positions of the lenses and the positions of the pupils. In addition, the correct/incorrect example 310 is disposed in the adjustment screen 300, whereby it is possible to effectively assist setting of an appropriate inter-lens distance, and appropriate adjustment of the orientation of the head-mounted display 100.

The present invention has been described above in reference to an embodiment. The embodiment is an example, and a person skilled in the art would understand that various variations can be made to combinations of respective components or processing processes of the embodiment, and that these variations are within the scope of the present invention.

A variation will be described. Although description is not given in the embodiment described above, in a case where a state in which the positions of the user's pupils are within an appropriate range with respect to the positions of the lenses in the head-mounted display 100 has continued for a predetermined threshold for an amount of time or longer, the adjustment screen generation unit 280 in the image generation apparatus 200 may set content suggesting that the inter-lens distance for the head-mounted display 100 is appropriate, in the adjustment screen 300. Regarding the abovementioned threshold for an amount of time, an appropriate value may be determined by means of experimentation using the image display system 10 or the knowledge of a developer. 1.3 seconds is assumed below.

It may be that, in a case where the magnitude of deviation between the positions of the lenses in head-mounted display 100 and the positions of the user's pupils, which is successively detected by the deviation detection unit 278, is less than or equal to a predetermined threshold (for example, ±3 millimeters), the adjustment screen generation unit 280 determines that the positions of the user's pupils with respect to the positions of the lenses are within an appropriate range. In addition, the adjustment screen generation unit 280 may determine that the positions of the user's pupils are in an appropriate range in a case where the centers of the user's pupils detected by the line-of-sight measurement unit 276 are positioned within the range of a circle having a radius of approximately 3 millimeters from the centers of the lenses in the head-mounted display 100. The adjustment screen generation unit 280 may make a determination for each of the user's left and right pupils.

Figure 14:
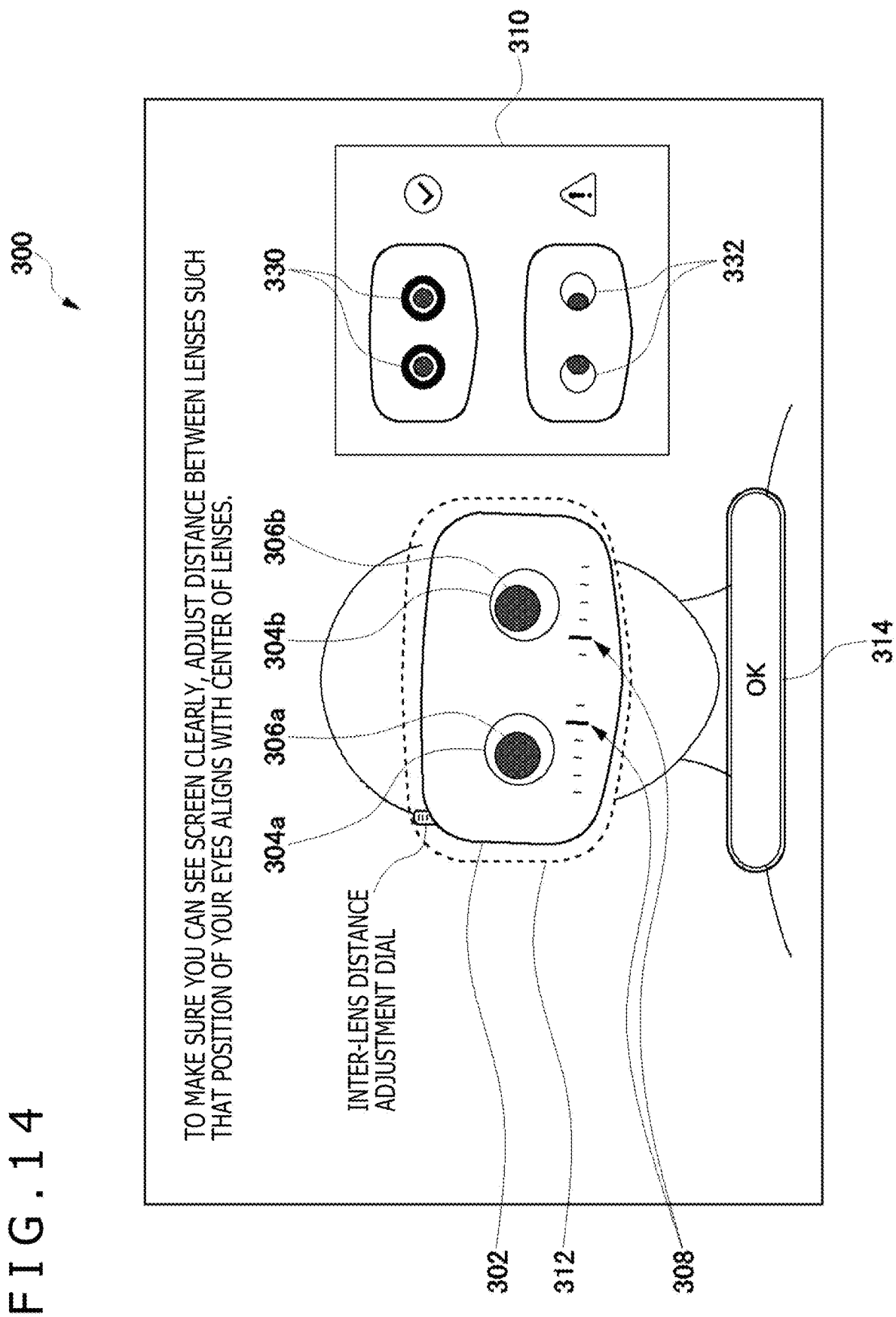
FIG. 14 is a view that illustrates an adjustment screen according to a variation.

FIG. 14 illustrates an adjustment screen according to the variation. In an example that illustrates a correct positional relation that is disposed in the upper level in the correct/incorrect example 310, outlines of lens images 330 are set to a mode suggesting that the inter-lens distance for the head-mounted display 100 is appropriate. The mode suggesting that the inter-lens distance is appropriate may be, for example, outlines similar to the left lens image 304a and the right lens image 304b in FIG. 15(d) described below, or may be a special color such as blue. In addition, the mode suggesting that the inter-lens distance is appropriate may be the same as a second mode that is among a plurality of modes for a feedback object 334 described below and suggests that the inter-lens distance for the head-mounted display 100 is appropriate. Note that, in an example indicating an incorrect positional relation that is disposed in a lower level of the correct/incorrect example 310, the outlines of lens images 332 are set to a normal mode.

FIGS. 15(a) through 15(d) illustrate display examples for feedback objects in adjustment screens. Upon detecting that the positions of the user's left and right pupils are both within an appropriate range, the adjustment screen generation unit 280 starts measuring an amount of time in which the positions of the user's left and right pupils are within the appropriate range. Below, a case where the positions of the user's pupils are simply within an appropriate range means that both of the positions of the user's left and right pupils are within the appropriate range. In addition, a case where the position of a user's pupil has departed from the appropriate range means that the position of at least one of the user's left and right pupils has departed from the appropriate range.

As illustrated in FIG. 15(a), for 0.3 seconds after detecting that the position of a user's pupil is within the appropriate range, the adjustment screen generation unit 280 does not feed this fact back to the user, in other words, does not cause the adjustment screen 300 to display a later-described feedback object. Here, in a case where the position of the user's pupil is at a position that is at the very limit of the appropriate range, a process for drawing a later-described feedback object 334 would become busy with detection going back and forth frequently between appropriate/departing, and a delay of 0.3 seconds is provided as mitigation means for preventing the user's understanding from being obstructed.

As illustrated in FIG. 15(b), the adjustment screen generation unit 280 starts drawing the feedback objects 334 in a case where the position of the user's pupils continue to be within the appropriate range for 0.3 seconds after detecting that the user's pupils are within the appropriate range. The feedback objects 334 are drawn along the outlines of the left lens image 304a and the right lens image 304b, and are set to a first mode in which there is more emphasis than the outlines of the left lens image 304a and the right lens image 304b. For example, in a case where the outlines of the left lens image 304a and the right lens image 304b are each a fine gray line that has low brightness, the first mode for the feedback objects 334 may be a thick white line that has high brightness.

As illustrated in FIG. 15(c), the adjustment screen generation unit 280 draws feedback objects 334 such that the outlines of the left lens image 304a and the right lens image 304b are lapped in one second. In a case of detecting that the position of a user's pupil has departed from the appropriate range before the feedback objects 334 lap the outlines of the left lens image 304a and the right lens image 304b, the adjustment screen generation unit 280 deletes the feedback objects 334 from the adjustment screen 300, and returns the adjustment screen 300 to the state in FIG. 15(a). At this point, the amount of time in which the user's pupils have been within the appropriate range which had been measured thus far is also reset.

As illustrated in FIG. 15(d), in a case where the feedback objects 334 have lapped the outlines of the left lens image 304a and the right lens image 304b, in other words, a case where the positions of the user's pupils being within the appropriate range has continued for 1.3 seconds or more, the adjustment screen generation unit 280 sets the feedback objects 334 to a second mode. The second mode suggests that the inter-lens distance for the head-mounted display 100 is appropriate, and is more emphasized than the first mode.

For example, in a case where the first mode for the feedback objects 334 is a thick white line, the second mode may be a very thick blue line that has high brightness.

In a case of detecting that the position of a user's pupil has departed from the appropriate range while the feedback objects 334 are being displayed in the second mode, the adjustment screen generation unit 280 deletes the feedback objects 334 from the adjustment screen 300, and returns the adjustment screen 300 to the state in FIG. 15(*a*). At this point, the amount of time in which the user's pupils have been within the appropriate range which had been measured thus far is also reset.

The user, upon confirming that the feedback objects 334 in the adjustment screen 300 are displayed in the second mode, selects (presses) the end button 314 in the adjustment screen 300, and ends adjustment of the inter-lens distance. By virtue of the present variation, it is possible to provide visual feedback (the feedback objects 334) to a user when the inter-lens distance is being adjusted, whereby the user can intuitively and correctly determine whether the inter-lens distance is appropriate.

Another variation will be described. In a case such as where a user has closed his/her eyes, it may be that the line-of-sight measurement unit 276 in the image generation apparatus 200 does not detect the position of at least one of the user's left eye and right eye. It may be that the adjustment screen generation unit 280 disposes only the right eye image 306*b* in the adjustment screen 300 in a case where the position of the user's left eye is not detected, and disposes only the left eye image 306*a* in the adjustment screen 300 in a case where the position of the user's right eye is not detected. In addition, in a case where the positions of both the user's left eye and right eye are not detected, the adjustment screen generation unit 280 does not need to dispose both the left eye image 306*a* and the right eye image 306*b* in the adjustment screen 300. In a case of not disposing at least one of the left eye image 306*a* and the right eye image 306*b* in the adjustment screen 300, the adjustment screen generation unit 280 may cause the adjustment screen 300 to display, to the user, advice pertaining to adjustment of the inter-lens distance. This advice may be "Please press the OK button in a case where you can clearly see the screen, even if an eye is not being displayed," for example.

Yet another variation will be described. At least some functions among a plurality of functions implemented by the image generation apparatus 200 in the above-described embodiment may be implemented by the head-mounted display 100, or may be implemented by a server that is connected to the image generation apparatus 200 via a network. For example, the head-mounted display 100 may be provided with a function for generating various kinds of screens or image data in reference to a camera image or a sensor measurement value. In addition, the server may be provided with a function for generating various kinds of screens or image data in reference to a camera image or a sensor measurement value, and the head-mounted display 100 may display a screen or an image generated by the server.

Any combination of the embodiment and variations described above is valid as an embodiment of the present disclosure. A new embodiment that arises by this combining has the effects of respectively combined embodiments and variations. In addition, a person skilled in the art would also understand that functions to be fulfilled by respective constituent features described in the claims are realized solely by respective components described in the embodiment and variations, or through cooperation of them.

Industrial Applicability

The present invention can be applied to an apparatus or a system for assisting the adjustment of an inter-lens distance for a head-mounted display.

REFERENCE SIGNS LIST

10: Image display system
100: Head-mounted display
200: Image generation apparatus
264: Display control unit
272: Inter-lens distance obtainment unit
276: Line-of-sight measurement unit
278: Deviation detection unit
280: Adjustment screen generation unit.

The invention claimed is:

1. An information processing apparatus comprising:
   an adjustment screen generation unit that generates an adjustment screen for allowing a user who is wearing a head-mounted display to adjust an inter-lens distance for the head-mounted display; and
   a display control unit that causes the head-mounted display to display the adjustment screen, wherein the adjustment screen generation unit disposes, in the adjustment screen, a lens image indicating a lens in the head-mounted display and also disposes, in the adjustment screen, a pupil image that indicates a pupil of the user in reference to an eye tracking result;
   wherein, in a case where the user has performed an operation for changing a position of the lens, the adjustment screen generation unit changes a position of the lens image in the adjustment screen.

2. The information processing apparatus according to claim 1, wherein, in a case where a magnitude of deviation between a position of the lens in the head-mounted display and a position of a pupil of the user is greater than or equal to a predetermined threshold, the adjustment screen generation unit sets content suggesting the deviation to the adjustment screen.

3. The information processing apparatus according to claim 1, wherein the adjustment screen generation unit also disposes, in the adjustment screen, at least one of an example that indicates correct positions for the lens image and the pupil image and an example that indicates incorrect positions for the lens image and the pupil image.

4. The information processing apparatus according to claim 1, wherein, in a case where a state in which a position of the pupil of the user with respect to a position of the lens in the head-mounted display is within an appropriate range has continued for a predetermined amount of time or more, the adjustment screen generation unit sets content suggesting that the inter-lens distance for the head-mounted display is appropriate to the adjustment screen.

5. An adjustment screen display method executed by a computer, comprising:
   generating an adjustment screen for allowing a user who is wearing a head-mounted display to adjust an inter-lens distance for the head-mounted display; and
   causing the head-mounted display to display the adjustment screen, wherein, in the adjustment screen, a lens image indicating a lens in the head-mounted display is disposed, and a pupil image that indicates a pupil of the user in reference to an eye tracking result is also disposed;

wherein, in a case where the user has performed an operation for changing a position of the lens, changing a position of the lens image in the adjustment screen.

6. A non-transitory computer-readable information storage medium for storing a program for causing a computer to:
- by an adjustment screen generation unit, generating an adjustment screen for allowing a user who is wearing a head-mounted display to adjust an inter-lens distance for the head-mounted display; and
- by a display control unit, causing the head-mounted display to display the adjustment screen, wherein the generating disposes, in the adjustment screen, a lens image indicating a lens in the head-mounted display and also disposes, in the adjustment screen, a pupil image that indicates a pupil of the user in reference to an eye tracking result;

wherein, in a case where the user has performed an operation for changing a position of the lens, the adjustment screen generation unit changing a position of the lens image in the adjustment screen.

* * * * *